W. H. VELTON.
AUTOMOBILE HEADLIGHT.
APPLICATION FILED APR. 15, 1918.

1,319,815.

Patented Oct. 28, 1919.
2 SHEETS—SHEET 1.

W. H. Velton, Inventor

W. H. VELTON.
AUTOMOBILE HEADLIGHT.
APPLICATION FILED APR. 15, 1918.
1,319,815.
Patented Oct. 28, 1919.
2 SHEETS—SHEET 2.
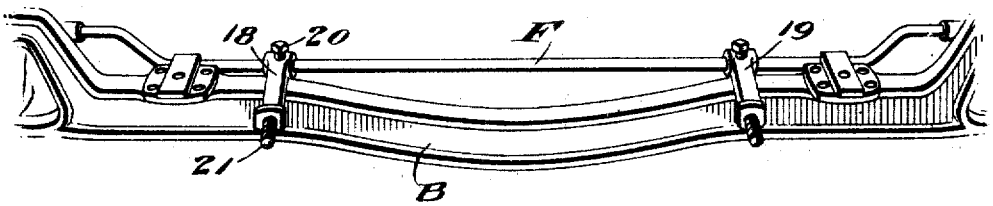
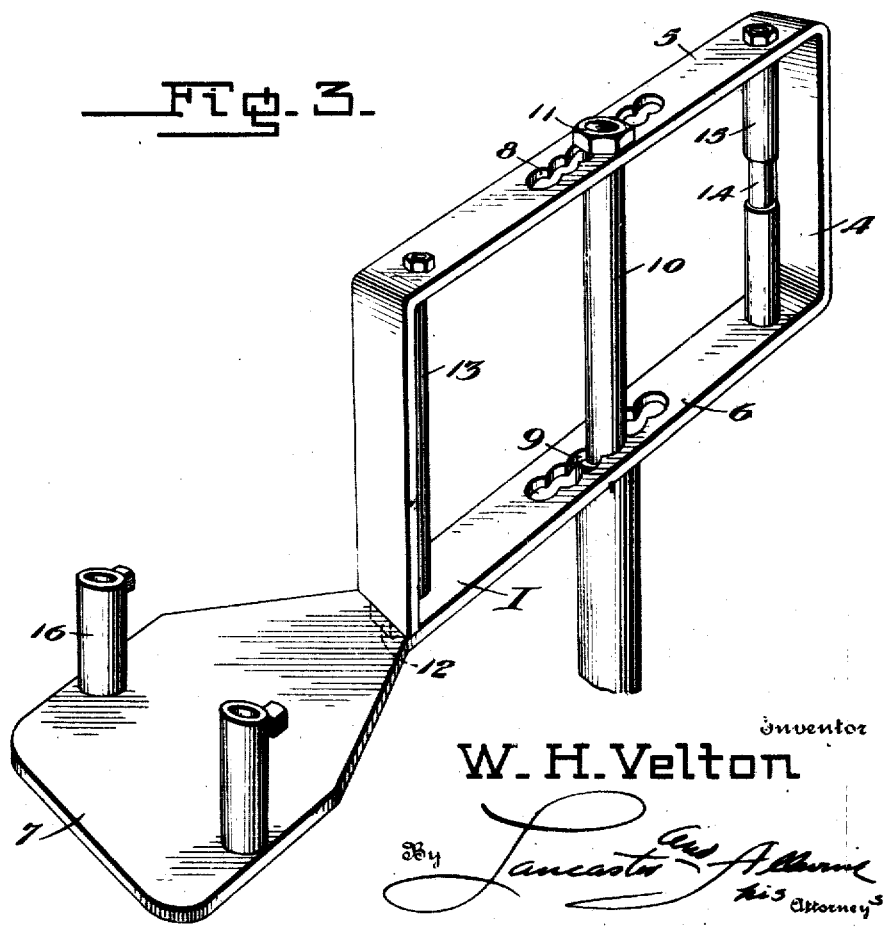
Inventor
W. H. Velton
By Lancaster Allwine
his Attorneys

UNITED STATES PATENT OFFICE.

WILLIAM H. VELTON, OF RAY, ARIZONA, ASSIGNOR OF ONE-HALF TO GEORGE H. STAIGER, OF RAY, ARIZONA.

AUTOMOBILE-HEADLIGHT.

1,319,815. Specification of Letters Patent. Patented Oct. 28, 1919.

Application filed April 15, 1918. Serial No. 228,693.

*To all whom it may concern:*

Be it known that I, WILLIAM H. VELTON, a citizen of the United States, and a resident of Ray, in the county of Pinal, and State of Arizona, have invented certain new and useful Improvements in Automobile-Headlights, of which the following is a specification.

My present invention relates to automobile headlights, and particularly to a dirigible headlight, or one intended for use to illuminate the path to be followed by the vehicle, when the same is traveling either upon a straight road or is rounding curves.

An object of my invention is to provide a structure of the character described which can be fitted to machines at the factory, or which can be handled as an accessory to be installed by the individual user.

A further object is to arrange an operating connection from the steering parts of the automobile by which the lamps are positively shifted, means being incorporated to compensate as the body of the vehicle moves with respect to the steering rod due to compression and expansion of the load springs and to cushion shocks which would otherwise be imparted to the lamps from the steering rod due to movement of the same by oscillation of the wheels through striking irregularities in the roadway.

Another object is to provide lamp supporting members by which the headlights are carried, and which are mounted adjustably to be set to shift the lamps to project their light beams in proper paths.

Further objects of my invention will appear in the following detailed description, taken in connection with the accompanying drawings, forming a part of this specification, and in which drawings:

Figure 1 is a view in perspective of the forward end of an automobile showing my invention applied thereto.

Fig. 2 is a fragmentary perspective view illustrating the manner in which an operative connection is established to the steering rod of the vehicle.

Fig. 3 is a perspective view showing the lamp supporting member which will be employed to carry each of the headlights.

Fig. 4 is a fragmentary view partially in section of the coupling which connects the operating rods, adjacent their point of crossing.

In the drawings, where similar characters refer to similar parts throughout the views, A designates the forward part of the body structure of an automobile which includes the radiator, the hood, and other associated parts, this structure being supported from the front axle B, by means of load springs C. Wheels D are mounted on the axle B, while mud guards E are disposed over the wheels, the parts being in fact those of an automobile of standard construction. The wheels D are turned to accomplish stearing of the vehicle, by the steering rod F, which is connected with a steering post turned by a steering wheel, or is otherwise shifted to accomplish proper movement and setting of the wheels. Lamps G and H are mounted by brackets I, the construction and fitting of which will be hereinafter more fully set forth, and these lamps are set at points corresponding substantially to the usual mounting of the headlights when the same are fixed upon the vehicle structure. A rod J connects the lamps G and H, and as the lamps are mounted to have turning movement, it will be seen that as one lamp is turned or shifted, the remaining lamp will be given corresponding movement. Shifting rods K and L are provided to establish connection from the steering rod F to the lamps G and H, and through this connection the lamps will be turned as the rod F is shifted to set the wheels G for the steering of the vehicle.

Each of the brackets I is made up of a single member which is bent and shaped to provide a bridle 4 having upper and lower bars 5 and 6, the lower bar having an extension 7 which widens at the forward end thereof. The bars 5 and 6 have the slotted openings 8 and 9 formed therethrough, these slotted openings being notched at their edges and the upper end of a bracket support 10 is fitted through the slotted openings 8 and 9, a clamp nut 11 being provided to tighten against the bridle 4 to secure the same in the set position. As the notches of the upper and lower slots are formed to substantially register, as the upper end of the bracket support is fitted through alined notches and is secured by the clamp nuts 11, the bridle will be held in horizontal disposition, and as the bracket supports are mounted to have revoluble movement, the bridles will be capable of swinging movement upon a vertical axis. The bridle 4 might be constructed of a single piece of material bent to form the upper and lower bars 5 and 6 with end portions between the same, and in the present instance I have shown a tongue 12 upon the downwardly bent extension of the upper bar 5 which is passed through a correspondingly shaped slotted opening in the lower bar 6, a bolt 13 being mounted between the bars 5 and 6 to hold this forward upright portion in the proper fitting. A bolt 14 is mounted through openings provided in the bars 5 and 6, which bolt is intended to be used as a pivot and bushings 15 are provided on the ends of this bolt. The widened out extension 7 of the bracket I has lamp mounting portions 16 thereon, it of course being understood that these portions will be constructed to receive and hold the particular lamp which is to be fitted in place. While in the present instance, I have shown the widened out extension 7 and the lamp mounting portions 16 as the structure by which the lamp is to be carried, it will be understood that the lower bar 6 of the bridle I might terminate in forked extension shaped to form horns upon which a lamp would be mounted, it of course being appreciated that the structure of these parts will be in a great measure varied to fit the particular lamp.

The lamp connecting rod J has bearing openings at the ends thereof for reception of the bolts 14 as carried by the bridles I, and the bushing portions 15 hold this rod in proper disposition. To give additional support to the lamp mountings, spring portions 17 might be arranged between the bracket supports 10 and the mud guards E of the machine, or other portions of the fixed body structure.

As the steering rod F is ordinarily disposed behind the forward axle B, whereas the shifting rods K and L are mounted in front of the radiator of the machine, the arms 18 and 19 are provided to be rigidly fixed on the steering rod F by means of bolts 20, these arms 18 and 19 having threaded stems 21 on their free ends. The shifting rods K and L have eyes provided for reception of the threaded stems 21, and cap nuts are fitted on the stems to retain the shifting rods in this mounting, it of course being understood that a pivotal mounting is established by the arrangement set forth. The rods K and L are extended from the arms 18 and 19 in a crossed relation and springs 22 and 23 are connected with the ends of the rods K and L and then at their free ends are secured in eyes 24 provided in the connecting rod J. If desired, a member 25 might be fitted to the shifting rods K and L, at the point of crossing to provide an anti-rattling connection at this point, it of course being understood that the member must slide upon each of the shifting rods.

The operation of the headlight is as follows:

Assuming that the structure is to be applied to an automobile as already in use, the bracket supporting members 10 will be mounted at suitable points upon the forward body or frame structure of the automobile and will be suitably braced, as by means of the member 17, following which the connection of the remaining parts is made after the manner as hereinbefore set forth. As the steering rod F is shifted to turn the wheel D of the vehicle, the arms 18 and 19 will be carried either to the right or the left, as the parts are shown in Fig. 1, and the shifting rod which has pulling force exerted thereon will impart movement to the connecting rod J through the spring connected thereto. The shifting rod which has pushing force exerted thereon does not materially aid in the movement of the connecting rod J, but the spring associated therewith acts to hold the rod against excessive endwise movement. As the rod J is connected with each of lamp supporting brackets, movement of this rod in either direction will accomplish equal turning of the headlights, through shifting of the brackets around their swinging mounting on the bracket supports 10. By this arrangement of the parts, the headlights G and H will at all times be disposed to project the light beams therefrom in front of the vehicle, whether the same be traveling on a straight road or is making a turn, and by provision of the springs 22 and 23, the relative movement of the axle B with respect to the body of the frame portion, due to compression and expansion of the load springs C, is compensated for.

Changes in details may be made without departing from the spirit or scope of my invention; but,

I claim:

1. In an automobile headlight structure, the combination with a pair of lamps, of a rod connecting the lamps for synchronous movement, shifting rods connected with the steering gear of the vehicle and extended in cross relation and connected to said lamp connecting rod, a coupling connecting said rods and their crossing portions and slidably mounted upon said rods to permit independent longitudinal movement of one rod with respect to the other.

2. An automobile headlight structure including in combination with a pair of lamps, a rod connecting the lamps for synchronous movement, shifting rods connected with the steering gear of the vehicle and extended in cross relation, springs connected to the upper ends of said rods and to said lamp connecting rod, a coupling connecting said rods at their crossing portions and slidably mounted upon said rods to permit independent longitudinal movement of one rod with respect to the other.

3. In an automobile headlight structure, the combination, of bracket supporting posts, brackets pivotally mounted upon the upper ends of said posts, lamps carried at one end of said brackets, said brackets provided with notched slots receiving therethrough the upper ends of said posts to permit adjustments of the connection between the posts and the brackets, means connecting said brackets for synchronous movement, and means connecting the brackets to the steering structure of a vehicle to operate the brackets by operation of the steering structure.

4. In an automobile headlight structure, the combination, of bracket supporting posts, brackets pivotally mounted upon the upper ends of said posts, lamps carried at one end of said brackets, said brackets provided with notched slots receiving therethrough the upper ends of said posts to permit adjustments of the connection between the posts and brackets, a rod connecting said brackets for synchronous movement, shifting rods connected with the steering gear of the vehicle and extended in cross relation, and connected to said bracket connecting rod, a coupling connecting said rods at their crossing portions and slidably mounted upon said rods to permit independent longitudinal movement of one rod with respect to the other.

5. An automobile headlight structure including with lamps mounted to swing on vertical axes, a rod connecting said lamps to swing together, arms mounted in fixed relation adjacent the ends of the steering rod of the automobile, shifting rods pivotally mounted on said arms and extended in cross relation, and springs connected to the free ends of said cross rods and to said lamp connecting rod to compensate for movement of the steering rod with respect to the frame structure on which the lamps are mounted due to compression and expansion of the load springs of the vehicle.

6. In a dirigible headlight structure for automobiles, a lamp supporting bracket comprising a bridle having upper and lower bars which are provided with slotted openings notched at their edges, means carried by said bridle on one side of the slotted openings by which a lamp is received and held, a bolt carried at the opposite side of said slotted openings by which a shifting connection is established to the bridle, and a bracket supporting member adapted to be adjustably fitted through the slotted openings of the bridle and to be held within the notches thereof, said bracket supporting member having a clamp nut associated therewith to secure the bridle in place.

WILLIAM H. VELTON.